No. 870,630. PATENTED NOV. 12, 1907.
F. E. KINSMAN.
MEANS FOR CONTROLLING FLUID PRESSURE.
APPLICATION FILED DEC. 17, 1901.
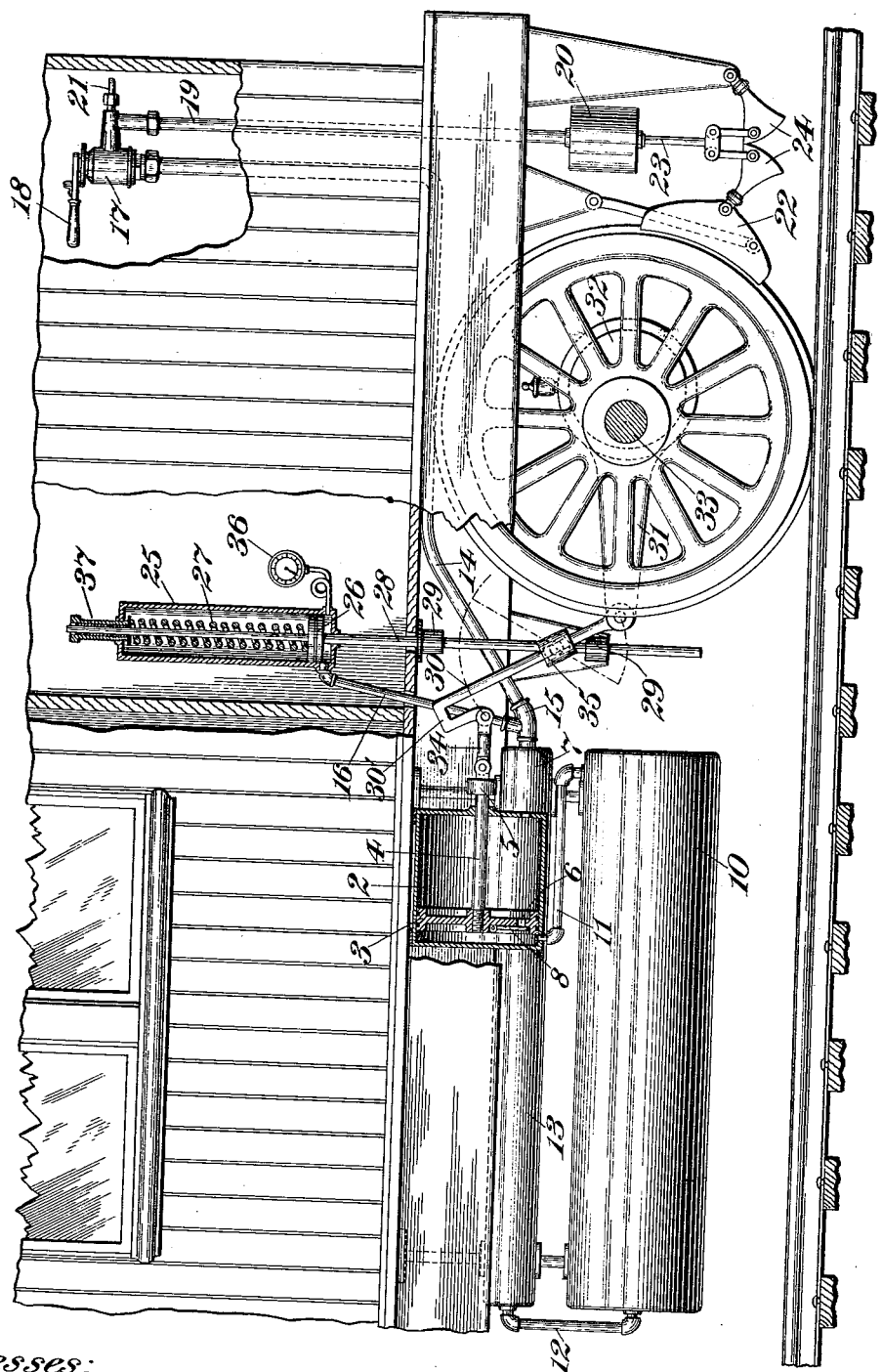
Witnesses:
J. L. Edwards
R. Champion
Inventor:
Frank E. Kinsman
By R. Champion
Attorney.

UNITED STATES PATENT OFFICE.

FRANK E. KINSMAN, OF PLAINFIELD, NEW JERSEY.

MEANS FOR CONTROLLING FLUID-PRESSURE.

No. 870,630.     Specification of Letters Patent.     Patented Nov. 12, 1907.

Application filed December 17, 1901. Serial No. 86,312.

*To all whom it may concern:*

Be it known that I, FRANK E. KINSMAN, a citizen of the United States, and a resident of Plainfield, in the county of Union and State of New Jersey, have invented certain new and useful Improvements in Means for Controlling Fluid-Pressure, of which the following is a specification.

This invention relates to means for controlling fluid pressure, and especially to a brake system for automatically varying the pumping action as the pressure developed in the system by a pump increases or decreases, the main object of the invention being to reduce or stop the work done by the pump as the pressure therein, or in the system controlled thereby, approaches or attains the desired value, and particularly to reduce the stroke of the pump gradually from maximum to zero, and increase the same from zero to maximum stroke, as the pressure in the pump, or in the fluid-pressure system in communication therewith, rises from atmospheric pressure to the desired maximum or falls from the maximum to atmospheric pressure.

Automatic pressure-regulating apparatus of this type is especially adapted for use in connection with fluid-pressure brakes controlled by pressure in a system governed by a pump operated from a continuously-rotatable driver, such as an axle of a vehicle or train movable along a line of way or railway, for the reason that when the pressure in the fluid-pressure brake system is controlled by a pump operated from a continuously-rotatable axle in accordance with my invention the operation of the pump may be varied automatically, in accordance with the requirements of the system, without regard to the continuous rotation of the axle from which power is derived. This is a very important feature in actual practice, as in ordinary fluid-pressure brake systems, the pumps of which are operated from the continuously-rotating axles of the train there is excessive strain on each of the pumps, due to the fact that it has to make its full stroke and exert its maximum pumping effect at each operation, regardless of the fact that the limit of pressure, either compression or vacuum, may have been attained. As the full working effect has to be exerted at each stroke in the systems now in use there is also unnecessary wear on the operating parts, excessive vibration and noise due to the movements of these parts and excessive noise due to the hissing consequent upon the escape or inrush of air when the maximum pressure is reached and an automatic safety-valve common to such systems is opened to permit the escape of excessive pressure of compressed air or the inrush of air to reduce a vacuum too highly attenuated.

In the drawing accompanying this specification and forming part of the present application I have shown a fluid-pressure brake system embodying an automatic pressure-controlling apparatus illustrating one embodiment of my invention.

The construction shown illustrates one way in which the pumping action may be varied, power saved, and excessive wear on and straining of the pump avoided, in a fluid-pressure brake system the pressure in which is governed by a pump operated from a continuously-rotatable driver. The particular mode in which the pressure-developing operation is varied in the construction shown is by varying the stroke of the compressor between given maximum and minimum points, and especially by varying the stroke of the pump-piston from maximum to zero, it being evident that in such an embodiment of the invention, while the piston will be enabled to make its maximum stroke at the proper times, its operation may cease entirely when the maximum compression or vacuum is attained, and this without affecting at all the continuous rotation of the driver or axle from which the pump-piston derives its movement.

The pump by means of which compression or exhaustion is produced may be of any usual type, and I have illustrated herein an ordinary force-pump or compressor 2, the piston of which is designated by 3, and the piston-rod by 4, this latter being preferably movable through a guide 5, while the piston and the casing of the pump 2 have the ordinary inlets 6 and 7, the former of which may be closed by the valve 8. As air is drawn into the pump 2 and compressed therein it may be delivered into any suitable chamber or receiver therefor, such as that illustrated at 10, which may be connected by a pipe 11, with the compression side of the pump, and in this instance constitutes the main air reservoir of a compressed-air brake system. The work done by the pump is intended to be varied in accordance with the pressure on the compression side thereof, that is to say, in accordance with the pressure, in this instance, in the main chamber or reservoir 10, and this regulating action should vary as the pressure in said reservoir rises or falls, and hence the pressure-developing operation of the pump, which in this case is the stroke of its piston, should also vary as such pressure rises or falls. In compressed-air brake systems it is customary to force the compressed-air from the main chamber 10 through a pipe 12 into another main chamber 13 constituting a dry-air chamber, or reservoir, and to connect the train-pipe of the system directly with this dry-air chamber, and such is the construction shown herein, the train-pipe in this case being designated by 14, and being connected to one arm of a Y-coupling 15, while a pipe 16, may lead from the other arm of this coupling to the primary elemer of the fluid-pressure regulator. Pressure in the system may be controlled by an ordinary three-way valve, such as 17, to the stem of which is connected the usual manual controller or engineer's brake-handle 18, by means of which communication may be kept open between the train-pipe 14 and a pipe 19, leading to a brake-controlling chamber 20, or closed to the pipe 14 and opened between the pipe 19 and the usual outlet pipe 21, it being understood that when the pressure in the chamber 20 is allowed to escape a brake, such as 22, will be operated, this brake being connected, in the present construction, with the piston-rod 23 by toggle-cams 24.

The pipe 16 is intended to communicate with one end of a regulating chamber, such as 25, having therein a piston 26 movable back and forth, one side of such piston being in communication, as is evident, with the main chamber connected with the pump, while the piston may be operated in the other direction by a counteracting force at that side of the piston opposite such point of communication with the main chamber, a spring 27 being preferably employed for counteracting such fluid pressure. The movement of the piston 26 is the preferred means employed for controlling the operation, or working stroke, of the pump, by means of which pressure in the system is produced and maintained, and this movement may be transmitted in any suitable manner for accomplishing a regulation of the pumping action varying in accordance with, or proportional to, variations in the pressure in the system, or in the pump by means of which pressure in the system is developed. I deem it desirable, however, to transmit the movement of this piston to a mechanical element or intermediate having a movement of variable efficiency, such as a lever having a variable leverage controlled by the movement of said piston, and in the construction shown the piston has a long piston-rod 28, movable in suitable guides, such as 29, and hence having a simple movement in a straight line, and this piston-rod supports, and hence serves to shift, the pivot of a lever 30, one end of which lever is connected to suitable actuating means, such as an eccentric-rod 31, carried by an eccentric 32, secured to a continuously-rotatable driver, or car-axle, 33, while at its other end the lever 30 may be connected to a link 34, pivoted to the piston-rod 4. It will be noticed that the upper end of the lever 30 is continued some distance beyond the extreme load-point thereof, and that the link 34 is pivoted to the auxiliary portion 30' of said lever, this construction being employed in order to enable a guide, such as 35, which is pivoted on the piston-rod 28, and in which the lever 30 is pivoted, to move back and forth on said lever and to pass beyond the extreme minimum load-point to the point of no load, which is coincident with the fulcrum of said lever at the zero-point of leverage, that is, at the point where the pump-piston has no stroke while the axle 33 may be continuously rotating at a rapid rate of speed. The member 35 is preferably a sleeve pivoted in a fixed position on the piston-rod 28 and turns with the lever 30 in order to accommodate itself to the movement of said lever as the latter turns in the sleeve and also as the sleeve moves along said lever, and shifts the fulcrum-point of the same to shorten or lengthen the stroke of said lever.

The amount of pressure in the system may be indicated at some suitable point, as for example, at the regulating-chamber 25, by means of a gage 36, in communication therewith.

I may also provide, for the purpose of supplementing the automatic regulation of the pumping action, a hand-operated device for determining the stroke of the pump, a nut 37 for varying the tension of the spring 27 being employed herein for this purpose.

What I claim is:—

1. The combination with a compressed-air brake; of a compressed-air system governing the operation of said brake and embodying a compressor having a variable stroke, a reservoir, a train-pipe leading from said reservoir, a brake-pipe, an air outlet, a three-way valve for connecting said brake-pipe with the train-pipe or the air-outlet to admit pressure into the brake-pipe or release the pressure therein, a regulating chamber having a piston one side of which is in communication with said train-pipe, and a regulating spring at the other side of said piston; and means movable in correspondence with said piston and with the variable pressure exerted by the spring, and controlled by the movement of said piston consequent on the closing or opening of communication between the train-pipe and the brake-pipe by said three-way valve, for shortening or lengthening the stroke of the compressor at any point between maximum and minimum and thereby regulating the pressure in said train-pipe and brake-pipe.

2. The combination with a compressed-air brake; of a compressed-air system governing the operation of said brake and embodying a compressor having a variable stroke, a reservoir, a train-pipe, a brake-pipe, an air-outlet, controlling means for connecting said brake-pipe with the pressure in the system or the air-outlet to admit pressure into the brake-pipe or release the pressure therein, a regulating chamber having a piston one side of which is in communication with the pressure in the system, and a regulating spring at the other side of said piston; and means movable in correspondence with said piston and with the variable pressure exerted by the spring, and controlled by the movement of said piston consequent on the closing or opening of communication between the pressure in the system and the brake-pipe by said controlling means, for shortening or lengthening the stroke of the compressor at any point between maximum and minimum and thereby regulating the pressure in said system and brake-pipe.

3. The combination with a fluid-pressure brake, of a fluid-pressure system governing the operation of said brake and embodying a pump, a spring opposing such fluid-pressure, a reciprocatory controlling member subjected both to said fluid-pressure and to said spring pressure and actuated by the difference in pressure between said fluid-pressure and said spring pressure, and means governed by said controlling member and movable in correspondence therewith and with the variable pressure exerted by the spring for so varying the pumping action at any point between maximum and minimum as to constantly tend to maintain the normal fluid-pressure in the system for governing the brake.

4. The combination with a compressed-air brake, of a compressed-air system governing the operation of said brake and embodying a compressor, a spring opposing such air-pressure, a reciprocatory controlling member subjected both to said air-pressure and to said spring pressure and actuated by the difference in pressure between said air-pressure and said spring pressure, and means governed by said controlling member and movable in correspondence therewith and with the variable pressure exerted by the spring for so varying the compressing action at any point between maximum and minimum as to constantly tend to maintain the air-pressure necessary for releasing said brake.

Signed at New York in the county of New York, and State of New York this 13th day of December, A. D. 1901.

FRANK E. KINSMAN.

Witnesses:
 C. S. CHAMPION,
 R. CHAMPION.